July 7, 1931.  A. E. COMBS ET AL  1,812,863
SAWING APPARATUS
Filed Dec. 6, 1928  2 Sheets-Sheet 1
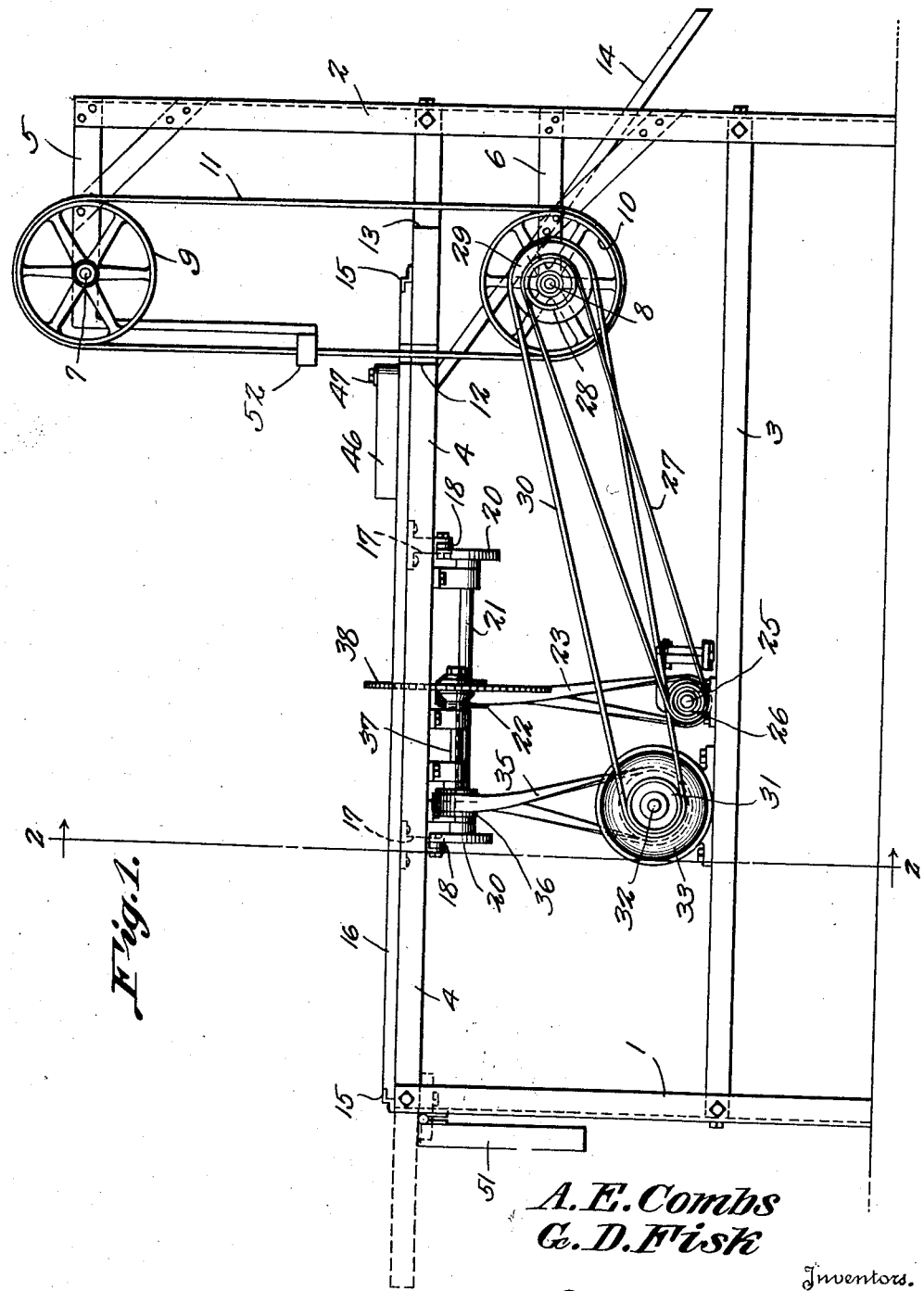
A.E.Combs
G.D.Fisk
Inventors.
By C.A.Snow & Co.
Attorneys.

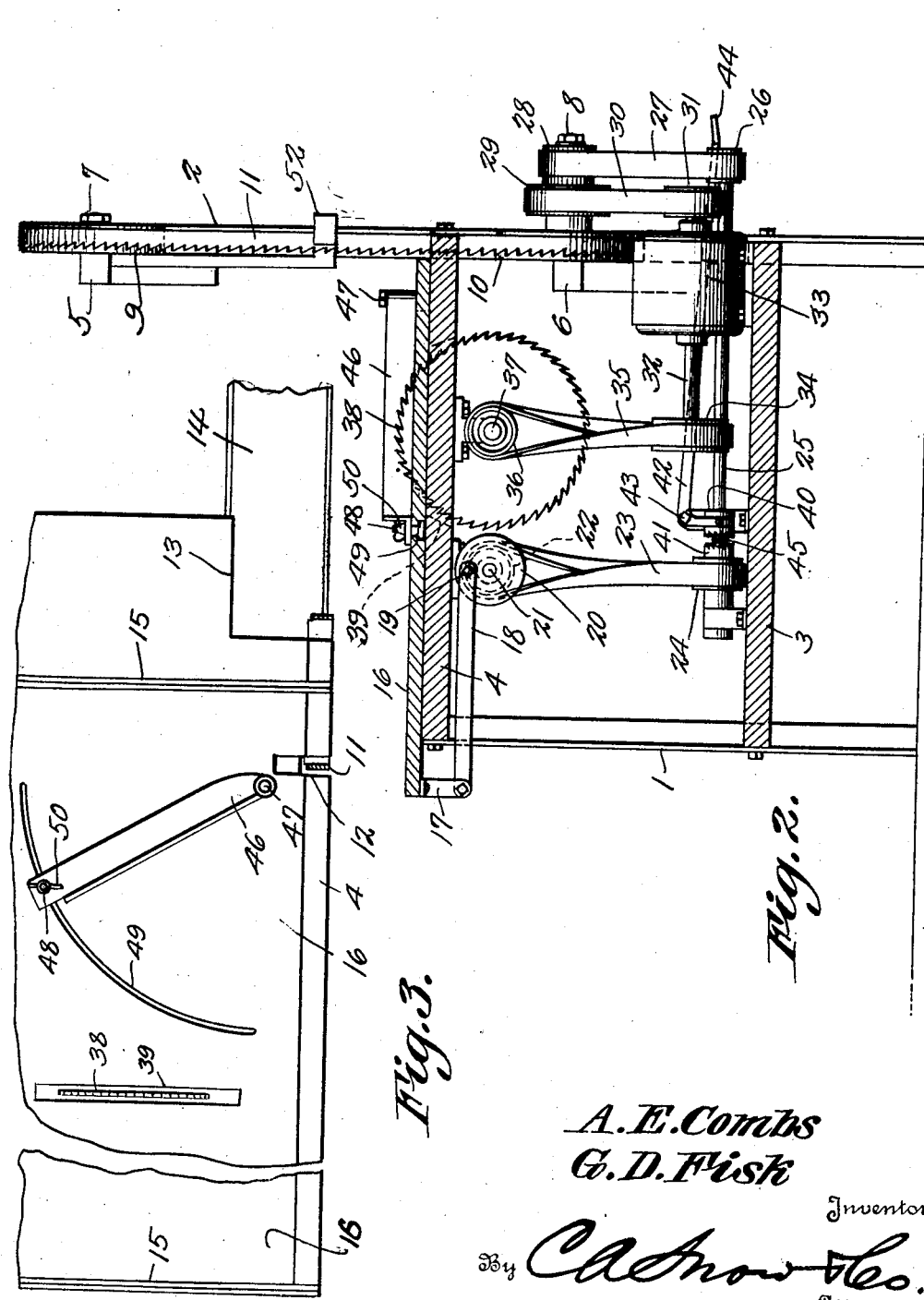

Patented July 7, 1931

1,812,863

UNITED STATES PATENT OFFICE

ALMON E. COMBS AND GEORGE D. FISK, OF FORT DODGE, KANSAS

SAWING APPARATUS

Application filed December 6, 1928. Serial No. 324,256.

This invention relates to sawing apparatus, one of the objects being to provide a structure having means combined therewith whereby stock to be cut can be fed automatically to the saw, the feeding means being constantly under the control of the operator.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a front elevation of the apparatus.

Figure 2 is a section on line 2—2, Figure 1.

Figure 3 is a top plan view of a portion of the apparatus.

Referring to the figures by characters of reference, 1 and 2 designate standards connected by a lower shelf 3 and a top 4, the standard 2 being extended above the top beyond one end thereof and provided with upper and lower brackets 5 and 6 providing bearings for shafts 7 and 8 respectively. A pulley 9 is mounted on the shaft 7 and another pulley 10 is mounted on the shaft 8, these two pulleys constituting supports for a band saw 11 adapted to work within slot 12 formed in the edge of the top 4.

As indicated at 13 one corner portion of the top 4 is cut away so that material falling through this cut away corner will be free to drop on to a delivery chute 14 supported beneath the top.

Parallel guide strips 15 are secured on the top 4 and are engaged by a slide 16 one edge of which projects beyond one edge of the top 4 and has depending brackets 17. These brackets are connected by pitmen 18 to wrist pins 19 on pulleys 20 or to similar structures. A shaft 21 that supports the pulleys or disks 20 has a pulley 22 secured thereto engaged by a twisted belt 23 that receives motion from a pulley 24 loosely mounted on a shaft 25 that is journaled on the shelf 3. A pulley 26 is secured to the shaft 25 and receives motion through a belt 27 from a pulley 28 on the shaft 8 and another pulley 29 on said shaft 8 receives motion through a belt 30 from a pulley 31 on the shaft 32 of an electric motor 33.

A pulley 34 is secured to the motor shaft 32 and is adapted to transmit motion through a twisted belt 35 to a pulley 36 secured to the shaft 37 of a circular saw 38, this saw being extended upwardly through a slot 39 in the top 4.

A clutch member 40 is feathered or otherwise connected to the shaft 25 so as to rotate therewith but slide thereon and this clutch member is adapted to move into and out of engagement with another clutch member 41 carried by the pulley 24. A foot lever 42 fulcrumed, as at 43, is extended beyond one side of the structure where it provides a treadle 44 adapted to be depressed by the operator. When thus actuated the lever 42 will shift the clutch member 40 into engagement with the clutch member 41, thereby coupling pulley 24 to the shaft 25. When the treadle is released a spring 45 interposed between the two clutch members 40 and 41 will push them apart and raise the treadle.

Mounted on the slide 16 is a gage strip 46 adjustable angularly about a bolt 47 and having another bolt 48 adapted to slide in an arcuate slot 49 formed in the slide 16. By means of a nut 50 this bolt can be tightened in the slot so as to hold the gage strip 46 in any position to which it might be adjusted. An extension leaf 51 can be hingedly connected to one end of the top 4 and used for supporting wood stock of considerable length.

In practice the circular saw 38 can be employed for cutting stock fed thereto either transversely or longitudinally. When it is desired to cut off lengths of stock and to feed the stock automatically to the band saw, the gage 46 is adjusted to properly feed the stock against the said saw and, by being set at any desired angle, can be adapted to stock of different shapes. After stock has been placed against the gage and back of the saw 11 the treadle 44 is depressed. This will couple pulley 24 to the rotating shaft 25 so that the disks or pulleys 20 will be rotated to cause the pitmen 18 to move the slide 16 forwardly and thence backwardly. This movement will be sufficient to feed the stock against the saw and to move the table backwardly following the severance of the stock, but the movement backwardly will not be sufficient to bring the stock against the saw 38. In order to sever the stock by means of saw 38 it is necessary to place it on the slide close to said saw before the slide begins its backward movement. The piece cut off by the band saw will fall off of the end of the slide 16 on to the guide trough 14. Treadle 44 is of course released immediately following the feeding operation so that the parts can be thus uncoupled from the power mechanism.

It is to be understood of course that the band saw 11 is to be provided with a guide 52 of any preferred construction.

What is claimed is:

Sawing apparatus including a table top having a corner portion cut away and a slot adjacent to said corner portion, of a band saw working within the slot and corner portion, a delivery chute extending under said corner portion for receiving objects gravitating through said corner portion, a slide mounted for reciprocation on the table top, a motor, disks mounted for rotation close to but beneath the table top, pitman connections between the disks and the slide, and means under the control of an operator for coupling the disks to or uncoupling them from the motor, said slide constituting means for feeding stock to the saw, said cut-away corner portion of the table top and the delivery chute being positioned to receive the end of the stock when severed.

In testimony that we claim the foregoing as our own, we have hereto affixed our signatures.

ALMON E. COMBS.
GEORGE D. FISK.